R. PARKER & W. E. HARRISON.
TRACTION ENGINE.
APPLICATION FILED OCT. 28, 1909.
989,035.
Patented Apr. 11, 1911.
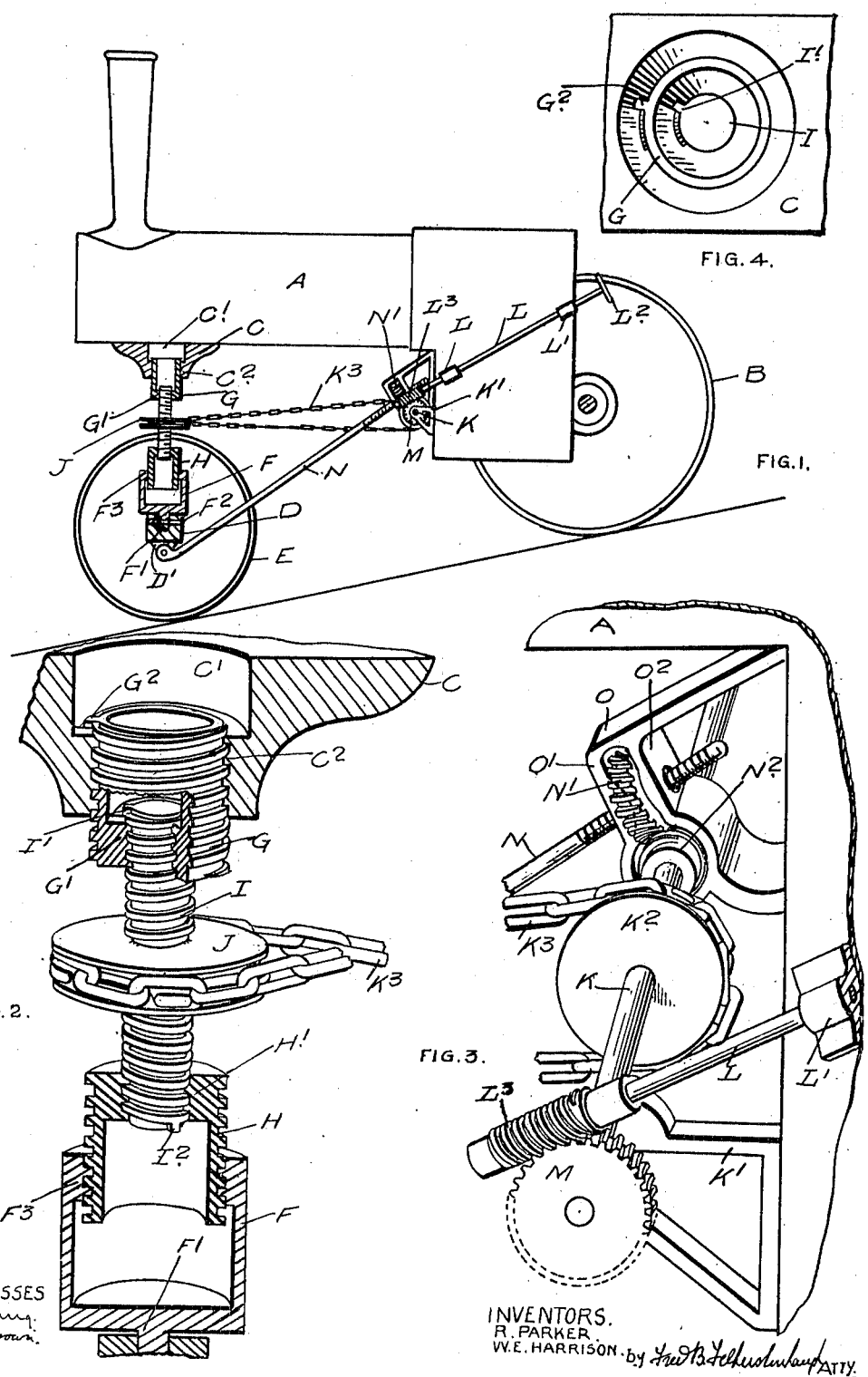

UNITED STATES PATENT OFFICE.

RICHARD PARKER AND WILMER EARNEST HARRISON, OF UNO PARK, ONTARIO, CANADA.

TRACTION-ENGINE.

989,035.

Specification of Letters Patent.

Patented Apr. 11, 1911.

Application filed October 28, 1909. Serial No. 525,163.

*To all whom it may concern:*

Be it known that we, RICHARD PARKER and WILMER EARNEST HARRISON, both of the village of Uno Park, in the district of Nipissing, in the Province of Ontario, Canada, have invented certain new and useful Improvements in Traction-Engines, of which the following is the specification.

Our invention relates to improvements in traction engines, and the object of the invention is to devise a simple means for adjusting the relation of the front axle to and from the front of the body of the engine in order that the boiler may be kept on a level whether going up or down hill and thus avoid the burning out of the crown sheet, which so frequently happens in the present construction of traction engine.

A further object is to maintain the front axle of the engine rigidly braced to the main body of the engine during the adjustment of the axle.

To effect these objects we have constructed our engine with a body casting under the front portion thereof provided with a central orifice to form a socket and a socket casting secured to the axle of the engine and right and left hand hollow sleeves fitting into threaded orifices in both castings, a supplemental right and left hand threaded spindle extending through threaded orifices in the aforesaid sleeves, a grooved wheel carried in the center of the spindle and operated from a worm gear on a cross shaft and controlled by a handle in proximity to the engineer's platform, and further of a brace pivotally connected to a lug at the bottom of the front axle and having the opposite end threaded and extending through the worm wheel meshing with the worm on the cross shaft controlled by the engineer's hand wheel, the parts being otherwise arranged and constructed in detail as hereinafter more particularly explained.

Figure 1, is a side elevation of the engine showing the parts involved in our invention mostly in section, and the engine going down hill. Fig. 2, is an enlarged sectional perspective view of the principal parts involved in our invention. Fig. 3, is an enlarged perspective detail of the controlling mechanism. Fig. 4, is a plan view of the body casting showing the stops on the sleeve and spindle.

In the drawings like letters of reference indicate corresponding parts in each figure.

A is the boiler and main body of the engine.

B are the rear drive wheels, which are journaled in suitable bearings attached to the engine.

C is a body casting provided with a central orifice C' forming a socket around the outer end of which extends the internally threaded flange $C^2$.

D is the axle and E the front wheels.

F is a socket having a depending lug F' through which and the axle extends a key $F^2$ to secure the socket F to the axle. The socket F is provided with an internally threaded flange $F^3$.

G is an upper externally threaded sleeve, which is provided with an internal flange G' at the bottom and a stop $G^2$ at the top designed to limit the downward movement of the sleeve G.

H is an externally threaded sleeve also provided at the bottom with a stop, not shown, similar to the stop $G^2$. The sleeve H extends through the threaded flange $F^3$ and is provided with an internal flange H' at the top.

I is a spindle having the upper half provided with a right hand thread and the lower half with a left hand thread. At the upper end is a limiting stop I' and at the lower end a limiting stop $I^2$, which serve to prevent the spindle I when it is manipulated from passing out of the flange G' and H' respectively.

J is a grooved chain wheel, which is secured to the center of the spindle I.

K is a cross shaft journaled in suitable bearings K' attached to the body of the engine. The cross shaft K is provided with a chain wheel $K^2$, which is connected to the chain wheel J by a chain $K^3$.

L is a spindle journaled in suitable bearings L' attached to the body of the engine and provided with a handle $L^2$ at the upper end in proximity to the driver, who would be on a platform, which is not necessary here to show.

$L^3$ is a worm secured on to the spindle L and meshing with the worm wheel M secured to the cross shaft.

It will now be seen that by manipulating the hand wheel $L^2$ the spindle I and sleeves G and H may be screwed upwardly or downwardly as may be desired, so as to vary and determine the distance between the axle and the body of the engine, so as to throw the bottom of the wheel E on the same horizontal plane as the bottom of the wheel B or above and below such horizontal plane depending upon whether it is desired to go up or down a hill.

In the drawings, as we have hereinbefore premised, we have shown the level of the bottom of the wheel E below the level of the bottom of the wheel B and the engine going down hill. By this adjustment of the wheels we are enabled to keep the boiler level either going down hill or up hill and thus avoid any burning out of the crown sheet, which frequently happens in traction engines as now constructed. In order to securely brace the axle and yet at the same time allow of the adjustment thereof without interfering with the rigidity of the bracing we have provided the adjustable bracing device.

N is a rod, which is pivotally connected at the front lower end to lugs D' beneath the axle D. The upper rear end of the rod is threaded and passes through a corresponding orifice in the worm wheel N' between the sides O' and $O^2$ of the bearing bracket O. The worm wheel N' meshes with the worm $N^2$ on the cross shaft K. The size of the wheel N' and worm $N^2$ is proportioned to the worm wheel M and worm $L^3$, so that upon the adjustment up and down of the axle in vertical relation to the body of the engine the brace N is correspondingly shortened or lengthened and thus the rigidity of the axle is maintained.

Although we have described in detail the several parts involved in our invention it will, of course, be understood that various changes may be made in construction without departing from the spirit of the invention.

Such a device as we describe insures dry steam to the engine, prevents water entering the cylinder and consequently adds life to the engine.

What we claim as our invention is.

1. In a traction engine, the combination with the body and the main drive wheels and axle, of the front wheels, a body casting secured beneath the front of the boiler and forming a socket, a socket secured to the axle of the engine, right and left hand threaded sleeves extending up into the upper body casting and lower socket respectively and provided with suitable stops, a right and left hand threaded spindle extending into the aforesaid sleeves and means for turning the spindle as and for the purpose specified.

2. In a traction engine, the combination with the body and the main drive wheels and axle, of the front wheels, a body casting secured beneath the front of the boiler and forming a socket, a socket secured to the axle of the engine, right and left hand threaded sleeves extending up into the upper body casting and lower socket respectively and provided with suitable stops, a right and left hand threaded spindle extending into the aforesaid sleeves, a pulley located centrally on the spindle, a cross shaft suitably journaled in bearings in the body of the engine, a pulley on the cross shaft, a chain connection between such pulley and the pulley on the screw spindle, and means for turning the cross shaft as and for the purpose specified.

3. In a traction engine, the combination with the body and the main drive wheels and axle, of the front wheels, a body casting secured beneath the front of the boiler and forming a socket, a socket secured to the axle of the engine, right and left hand threaded sleeves extending up into the upper body casting and lower socket respectively and provided with suitable stops, a right and left hand threaded spindle extending into the aforesaid sleeves, a pulley located centrally on the spindle, a cross shaft suitably journaled in bearings in the body of the boiler, a pulley on the cross shaft, a chain connection between such pulley and the pulley on the screw spindle, a worm wheel on the cross shaft, a spindle journaled in suitable bearings in the body of the engine and provided with a hand wheel at one end, a worm located on the other end of the spindle and meshing with the worm aforesaid as and for the purpose specified.

4. The combination with the body of the engine, the main wheel and axle and the front wheel and axle and means for adjusting the front axle in relation to the body, of a brace connected to the axle and means for automatically adjusting the length of the brace as the axle is being raised and lowered as and for the purpose specified.

5. The combination with the body and main wheels and axle and the front wheels and axle and the body casting forming a socket and the socket secured above the front axle and the screw spindle adjustable vertically in the sockets aforesaid and the pulley on the screw spindle, the cross shaft, the pulley on the cross shaft, the chain connecting the aforesaid pulley, means for turning the cross shaft, the brace pivotally connected beneath the axle at the lower and front end and having the upper end threaded, the worm
5 wheel on the upper end of the spindle located between the sides of the bearing bracket and the worm on the cross shaft meshing with the worm wheel as and for the purpose specified.

RICHARD PARKER.
WILMER EARNEST HARRISON.

Witnesses:
HENRY HARTMAN,
GEORGE MERLE MILLER.

Copies of this patent may be obtained for five cents each, by addressing the "Commissioner of Patents, Washington, D. C."